Patented May 3, 1932

1,856,156

UNITED STATES PATENT OFFICE

JOHN MANDERSON EVANS, OF BERKELEY, CALIFORNIA,

TREATING PETROLEUM EMULSIONS

No Drawing. Application filed April 19, 1924, Serial No. 707,779. Renewed August 24, 1931.

My invention relates to the treatment of emulsions more especially petroleum emulsions, for the purpose of separating their component parts.

Emulsions of oils and water may be of two types, namely "oil in water" or "water in oil". In an "oil in water" emulsion small particles of oil are dispersed throughout a continuous water phase. This emulsion is supported by a third substance known as the emulsifying agent which has been differentially adsorbed at the interface, producing changes in the interfacial tension which tend to maintain the emulsion in a stable form.

It is possible to produce either an emulsion of "oil in water" or "water in oil" by changing the emulsifying agent used, and it is also possible to convert one type into the other by adding an emulsifying agent with the reverse powers.

The addition of very small quantities of a material which tends to promote an emulsion of "oil in water" will "neutralize" the effect of the emulsifying agent, causing emulsions of the "water in oil" type and when the opposite forces are equalized the water will drop freely by gravity separation.

The main object of my invention is to provide a novel and inexpensive process for separating practically all petroleum emulsions into their component parts. To this end my invention comprises, essentially and generically the subjection of the emulsion to the action of the non-benzenoid cyclic hydrocarbons or their modified forms. These hydrocarbons are also known as alicyclic hydrocarbons, and as hydro-aromatic hydrocarbons, and they comprise, amongst others, the terpenes and the naphthenes. My invention further contemplates and comprises the employment of the naphthenes, or their modified forms as the specific and preferred agent to which for the purposes and objects sought, the emulsions are subjected, namely counterbalancing the effect of whatever emulsifying agent may be present in the emulsion and causing an equalization of surface tensions at the interface and separation of the water and oil in an effective and inexpensive manner.

While any of the modifications or derivatives of these naphthene compounds are more or less effective it has been found that on different emulsions where the emulsifying agent may differ one modification may be more effective than another. The following derivatives have been found particularly well adapted for this work;—sulfonates or other sulfur derivatives of the naphthenes, the nitrated derivatives of naphthenes or naphthenic acids, the salts or esters of naphthenes or naphthenic acids or mixtures of two or more of these substances.

The naphthenes belong to the saturated ring hydrocarbon compounds, are cyclic in structure and not to be confused with the chain or benzene-ring hydrocarbons. The acid derivatives are also cyclic in structure, non-benzenoid and are not to be classed as or considered as related to the fatty acid series.

I have found that from the so-called "alkali wash" or "waste alkali" which is obtained in refinery processes when petroleum or its fractions are washed or neutralized with alkali I can obtain naphthenes, naphthenic acids or their salts, and that these or their non-metallic organic modifications are very effective in breaking petroleum emulsions. This product is at present a refinery waste and therefore the isolation of these reactive materials can be accomplished very cheaply.

For example, I separate these compounds from the "alkali wash" or "waste alkali" by precipitation with a metallic salt or a mineral acid. The product thus obtained separates easily from the remainder of the solution by gravity settling and the naphthenates or naphthenic acids thus obtained may be nitrated by means of either nitric acid or sodium nitrite, or a combination of these. By this process a red, sticky substance is obtained, soluble in oil or creosote and very effective in causing the separation of the components of a petroleum emulsion.

As already pointed out other modifications such as the salts or esters may be used effectively by using slight variations of the above procedure.

In practise, to carry out my invention, I add to a relatively large amount of the emulsion to be treated a relatively small amount of the agent. As an example of these proportions, to which however, I am not to be confined, since these proportions may be varied according to conditions within the knowledge of those skilled in the art, I may state a range of one hundredth of one per cent to one per cent of the treating agent, to the mass of the emulsion treated. After adding the agent the mass is allowed to stand until the separation of the oil and water takes place.

I claim:

1. A process for treating petroleum emulsions, characterized by subjecting the emulsion to the action of a treating agent consisting of an ester of a naphthenic acid.

2. The herein described improvement which consists in separating the water from the oil in a petroleum emulsion by subjecting said emulsion to the action of a non-metallic organic derivative of a non-benzenoid cyclic hydrocarbon.

3. The herein described improvement which consists in separating the water from the oil in a petroleum emulsion by subjecting said emulsion to the action of a non-metallic organic naphthene derivative.

4. A process for treating petroleum emulsions, which consists in adding to a petroleum emulsion a non-metallic organic derivative of naphthenic acid, other than the alkaline metal soaps, and separating the water from the oil.

5. A process for treating petroleum emulsions, which consists in subjecting an emulsion to the action of a treating agent containing a nitrated naphthenic acid derivative.

6. A process for treating petroleum emulsions, which consists in subjecting an emulsion to the action of a treating agent containing a non-metallic organic nitrated naphthenic acid derivative.

In testimony whereof I have signed my name to this specification.

JOHN MANDERSON EVANS.